United States Patent [19]

Staupendahl et al.

[11] Patent Number: 4,739,287

[45] Date of Patent: Apr. 19, 1988

[54] APPARATUS FOR EXTERNAL MODULATION OF HIGH EFFICIENCY $CO_2$ LASER BEAMS

[75] Inventors: Gisbert Staupendahl, Halle-Süd; Manfred Pöhler, Halle-Neustadt; Klaus Schindler, Erfurt, all of German Democratic Rep.

[73] Assignee: VEB Kombinat Feinmechanische Werke Halle, Halle, German Democratic Rep.

[21] Appl. No.: 739,577

[22] Filed: May 30, 1985

[30] Foreign Application Priority Data

Jun. 8, 1984 [DD] German Democratic Rep. ................... 2640056

[51] Int. Cl.$^4$ ................................. H01S 3/10
[52] U.S. Cl. ................... 332/7.51; 350/485; 350/486
[58] Field of Search .............. 356/351; 332/7.51; 372/26; 350/6.5, 6.6, 99, 484, 485, 486

[56] References Cited

U.S. PATENT DOCUMENTS

| | | | |
|---|---|---|---|
| 1,808,137 | 6/1931 | Hartley | 350/485 |
| 2,565,514 | 8/1951 | Pajes | 350/485 |
| 3,412,324 | 11/1968 | Ludewig, Jr. | 350/485 |
| 3,834,795 | 9/1974 | Erickson et al. | 350/485 |

FOREIGN PATENT DOCUMENTS

| | | |
|---|---|---|
| 2242438 | 3/1974 | Fed. Rep. of Germany . |
| 140948 | 4/1980 | German Democratic Rep. . |
| 145588 | 12/1980 | German Democratic Rep. . |

OTHER PUBLICATIONS

Topics in Applied Physics, vol. 7—Integrated Optics, Edited by T. Tamir, Russian Edition 1978, pp. 196–211.
Journal of Quantum Electronics, vol. QE-2, No. 8, Aug. 1966, pp. 243–245.
Applied Optics, vol. 5, No. 1, pp. 87–91, Astheimer et al., "Infrared Modulation by Means of Frustrated Total Internal Reflection".

Primary Examiner—Salvatore Cangialosi
Attorney, Agent, or Firm—Jordan and Hamburg

[57] ABSTRACT

The invention relates to an apparatus for external modulation of high-efficiency $CO_2$ laser beams of defined wavelength, particularly for use in $CO_2$ laser material working apparatuses. According to the invention two plates made of transparent material are arranged parallel to each other, the inner surfaces of the plates are reflective and the outer surfaces are non-reflective. The two plates are mounted so that one of the plates is rigidly connected to a massive oscillation-resistant base which comprises a strong permanent magnet, and that the other plate, together with a special hollow cylinder, is fastened on an elastic membrane, so that an oscillatable system is formed which, on the one hand, is driven by the electro-magnetic interaction between the permanent magnet and a coil and that the system, on the other hand, is damped by means of the frictional force of a suitable damping medium of high viscosity located in a gap between the stationary and the oscillating subsystems, so that a reproducable adjustment of the setting of the gap's width between the two plates is possible via the control current of the coil.

10 Claims, 5 Drawing Sheets

Aluminum    Magnet    Iron    Coolant    Copper    Optical element

Seal     Coil

APPARATUS FOR EXTERNAL MODULATION OF HIGH EFFICIENCY $CO_2$ LASER BEAMS

FIELD OF APPLICATION

The invention relates to an apparatus for the external modulation of high-efficiency $CO_2$ laser beams of defined wavelength, particularly for use in $CO_2$ laser material working apparatuses. The primary field of application of the invention is for material working tasks, such as for instance material removal or engraving requiring high precision, by the continuous variation of the beam intensity or cracking and separating by periodic beam pulses of defined intensity.

CHARACTERISTICS OF THE KNOWN TECHNICAL SOLUTIONS

It is already known that it is advantageous for many applications of laser beams, that the actual beam source, the laser, be permitted to work stably with defined beam characteristics, and to produce an optionally required intensity modulation in accordance with the work requirements by means of modulators, which are arranged outside the laser resonator. Various technical solutions of such external intensity modulation are known.

The simplest variation is chopping the laser beam with rotating sector disks. Their great disadvantage, among others, is that they are only suitable for producing periodic modulations.

An apparatus which optically chops up a laser beam into discrete light pulses, described in the DE-OS No. 29 18 283, has the same disadvantage. In this apparatus, the beam pulses that are provided are applied sequentially and repeatedly to a number of target points by a rotating prism mirrow.

A modulation which can be freely selected within very large limits allows the utilization of the electro-optical effect in crystals or liquids. This method is very effective mainly in the visible spectral ranges. Accordingly, there exists a series of technical solutions for this range, for instance, the optical modulator disclosed in DE-OS No. 30 13 498. However, in the mid-range infrared of approximately 10 um wavelength, i.e., the range of the $CO_2$ laser illuminaltion, the electro-optical effect is very ineffective, a sufficient modulation depth can only be attained at great crystal lengths and high control voltages (see for instance IEEE Journal of Quantum Electronics, vol. QE-2, 243 (1966)).

Free modulation together with low control voltages make possible modulators of integrated optical construction. Especially for beams in the middle IR, for instance, there have been developed integrated optical modulators based waveguide structures in GaAs, which utilize the electro-optical effect in this material for the modulation (see for instance "Integrierte Optik" ("Integrated Optics") editor T. Tamir, published by Verelag Mir, Moskau, 1978). The main disadvantage of such modulators is the limitations of the beam energy by the destruction threshold of the waveguide structures. Due to the small cross-sections of the waveguides, the upper limit of the beam energy which can be modulated is approximately 100 W.

A series of modulator variations take advantage of interference effects of the beam, whereby apparatuses of the type of the Fabry-Perot interferometer are especially important.

DD-PS No. 140 948 describes an apparatus which allows the modulation, particularly the shortening of $CO_2$ laser pulses by quickly tuning the optical path length of a specific Fabry-Perot apparatus. Because the apparatus is based upon the fast rotation of one of the two interferometer plates. It is limited to periodic processes, and thus does not allow any free modulation.

DD-PS No. 145 588 describes how $CO_2$ laser beams can be modulated with the help of optical effects in semiconductors with the utilization of the effect of a Fabry-Perot apparatus. In this case, the rapid tuning of the optical path length and the associated tuning of the transmission of a semiconductor plate by means of varying the rotational speed n ensues, which is caused by the free charge carriers produced in the semiconductor plate. However, it only makes sense to use this apparatus for the shortening and the selection of laser pulses, it is not suitable for a free modulation of high-efficiency $CO_2$ laser beams.

Furthermore, DE-OS No. 2,242,438 disclosed an IRmodulator with the object of periodically modulating weak infrared beam by periodic changes of the distance between two interferometer plates, consisting of material which is transparent for the beams. According to this object, the modulator is designed so that it does not allow any free modulation of intensive $CO_2$ laser beams.

OBJECT OF THE INVENTION

The object of the invention is the provision of an apparatus for the external modulation of a high-efficiency $CO_2$ laser beams and defined wavelength, in which the apparatus is simple to operate, operates at relatively low costs, and has a long service life, and provides a solution for performing a wide range of material working tasks, for instance, such as engraving of high precision requirements, precisely defined material removal, for instance, such as laser inscription as well as etching or separating at high precision and speed at optimum quality as well as at high working productivity.

EXPLANATION OF THE NATURE OF THE INVENTION

The object of the invention is the provision of an apparatus for the external modulation of high-efficiency $CO_2$ laser beams and of defined wavelength, whereby the utilization of the apparatus allows for freely selectable variation of the intensity of the laser beams between an exactly defined maximum value and minimum value up to a given maximum modulation frequency determined by the physical-technical characteristics of the appartus, respectively to provide periodic beam pulses of defined intensity in a defined frequency, as well as advantageous application possibilities in connection with a peak energy laser by taking advantage of the attainable modulator specifications.

According to the invention this problem is solved by the following apparatus. The laser beam which has to be modulated is beamed-in perpendicularly, or approximately perpendicularly, on two plates arranged planar-parallel with respect to each other at a defined spacing. The plates are made of transparent material, preferably of Ge, GaAs or ZnSe, and are reflected on the precisely flat inside surfaces arranged facing each other, and are deflected on the outer surfaces. One one of these plates is rigidly connected, preferably via suitable adjustment elements (for the regulation of the planar-parallel distance from the other plate) to a massive base which comprises a strong permanent magnet including its assigned magnetic guide iron and a housing which is resistant to oscillation. On the opposite side thereof, in conjunction with a special hollow cylinder which is fastened on an elastic membrane, the other plate forms a system which can oscillate with respect to the instrument base. Changing the spacing of the plates, which is required for the modulation of the beam, is produced whereby the oscillatable system is driven by corresponding electrical cotrol signals by which the electromagnetic interaction between the permanent magnet and a coil through which the control current is flowing. The coil is mounted on a special hollow cylinder and is located in the air gap between the poles of the permanent magnet. In order to insure that the mechanical oscillator follows the curve of the control current within the given tolerances in the present frequency range of $f=0$ up to the resonance frequency, which is determined by the electrical and the mechanical system, the oscillatable system is damped by a damping medium of a defined high viscosity. The damping medium is located in the gap between the inner surface of the special hollow cylinder and the outside surface of hollow body arranged in a suitable way and fixedly connected to instrument base, preferably to the core of the permanent magnet. The magnitude of the damping is thereby exactly adjusted to the parameters of the oscillatable system. According to the invention, this adjustment is advantageously attained in that in the area which is effective for the damping, the inner surface of the special hollow cylinder and the outside surface of the hollow body functioning as a counter part thereof, are slightly conical with identical incline (increase of diameter) in the direction of the modulator axis, so that by means of a relatively slight shift of the hollow body along its axis, for instance, by means of a precision winding, the effective width of the gap between the special hollow cylinder and the hollow body can be varied. The gap is filled with a highly viscous damping medium. Thus it is possible to bring the system simply from the strongly damped state into the practically undamped state or vice versa, whereby the adjustable hollow body can be held in the corresponding adjusted position with the help of a suitable stop, for instance, a fastening ring. In order to carry off the heat resulting from the absorbed laser beams as well as from the coil current, in the total system, cavities are provided arranged in a specific way. The cavities allow circulating a thermostated cooling liquid, so that the entire apparatus can be kept at a substantially stable temperature.

According to a further characteristic of the invention, the relative position of the plates, i.e., their distance from one another and their parallel position in relation to each other, is controlled or indicated using a capacitive measurement. Thereby, the metallic mounting of the oscillatable optics, or the metal membrane, on which it is fastened, forms one of the capacitor surfaces, whereby the other surface is formed by a metal ring divided into three parts. The metal ring is arranged around the stationary optics and is tightly connected therewith. Therefore, each third of this ring forms a small capacitor with the oppositely positioned metal surface, the capacity of the small capacitor is measured with suitable electronic means and, if necessary, is indicated and/or evaluated for the creation of a variable which can be electronically influenced. Thus after corresponding calibration, for instance, it is possible to determine with simple means the specific distance between the plates. According to the invention, by assigning the three sections of the metal ring to the three adjustment elements, a simple and effective adjustment of the system is provided; the adjustment can be manual, for instance. Furthermore, in order to monitor the oscillation parameters of the system, only the display of the fast capacity changes, is needed and thus the distance changes, for instance, on an oscilloscope. In an advantageous embodiment of the present invention, the signals of the capacitive distance measurement, after comparison with a given desired value, are used for the regulation of the transmission of the modulator. At one time, this regulation allows the adjustment and stabilization of the operating point of the system, i.e., of the transmission condition of the modulator in a currentless coil. This is possible either without any positional changes of the adjustment elements by regulating the temperature of the thermostated cooling liquid, whereby the cavities provided for the circulation of the thermostated cooling liquid in the total system are arranged in such a way, that by setting the temperature of the thermostated cooling liquid, it is possible to adjust the distance between the plates in accordance with the required operating point, or the described adjustment and stabilization take place by electrically controllable adjustment elements, for instance, with the help of piezo control elements. On the other hand, the oscillation amplitude of the oscillator can be electronically regulated at a given desired value, whereby the current of the oscillator coil can be adjusted via the control magnitude resulting from the comparison between the desired value and the actual value for the distance.

The modulator according to the invention, in connection with further various apparatuses. allows a series of functions, which up to now either could not be performed, or could only be performed at unjustifiably high costs.

For the simple modulation of the beam of a high-efficiency $CO_2$ laser, the following apparatus is advangateous. The modulator is arranged outside the laser at a smallest possible angle of inclination of its optical axis in relation to the axis of the laser beam. This angle is selected such that the functioning of the modulator is not impaired by insufficient interference, and that, on the other hand, there is no feedback to the laser resonator with respect to the beam reflected by the modulator. By arranging an additional mirror for the reflected beam portion, it is thus possible to use the beam impinging upon the modulator such that the transmitted beam of the modulator can be used for accomplishing a work object with a given timewise intensity curve, and that the reflected beam can be used for accomplishing an analogous work object, however, at an inverse timewise intensity curve.

The basic apparatus can also be expanded whereby additional modulators are arranged in series after the first modulator such that the next modulator connected in series after the first modulator again divides the reflected portion of the beam of the first modulator into two beam portions each having inverse timewise intensity curves in relation to each other, whereby the reflected beam undergoes further treatment and the transmitted beam, as desired, is either deflected via a mirror and used , or is again modulated by another modulator and is divided into two beam portions, with the result, that by utilization of n modulators, there are created a total of $n+1$ working beams. By entirely freely selectable control, or if necessary, also various control of the individual modulators, the most varied combinations of work objects can be accomplished with such an apparatus.

The transmission characteristics of the modulator according to the invention as a function of the spacing of the plates, in connection with its electrodynamic drive principle, furthermore, makes possible the advantageous utilization of an optical-electrical feedback of a suitable dimension, whereby not only objects of stabilization, but also optical bi-stable behavior of the apparatus can be attained. For this purpose, a part of the transmitted beam is supplied to a detector via a beam splitter (for instance, a weakly reflecting splitter plate) whereby, via suitable feedback, the signal thereof controls the oscillator coil fo the modulator.

At the corresponding selection of the operating point in the proximity of a transmission maximum and of the electronic signal amplification, or for the degree of feedback, by means of the apparatus of the present invention extraordinarily effective stabilization of energy can be attained. Because the speed of the stabilization is determined thereby practically entirely by the threshold frequency of the modulator, which is in the kHz range for typical embodiments of the modulator, it is also possible to stabilize in this way rapid fluctuations of the laser energy. In particular, the apparatus can be advantageously utilized for the stabilization of fluctuations of laser energy which, for instance, are caused by the 50 Hz or 100 Hz ripple of an incompletely smoothed supply current of the laser.

In comparison therewith, if the operating point of the modulator is placed in the proximity of a transmission minimum then, at a suitable dimension of the electrical feedback, it is then possible to realize optical bi-stable behavior of the system. This means that the modulator remains in the low transmission state as long as the system is not influenced. If the system receives an interference in the form of a short pulse, (which can either be an electrical pulse directly applied to the oscillation coil or it can also be an additional short beam pulse emitted to the detector,) so that the operating point, due to the resulting deviation of the oscillatable plate exceeds the next transmission maximum, the system remains in the high transmission state attained in this way, even if the "interference" has again died away from the outside. The system is then in its second stable state, in which the described stabilizing effect occurs simultaneously. The system is again brought into the originally adjusted lower transmission state, for instance, by an electrical pulse of opposite sign.

PREFERRED EMBODIMENT

The invention will be explained in greater detail with reference to the accompanying drawings wherein.

Figure 1:
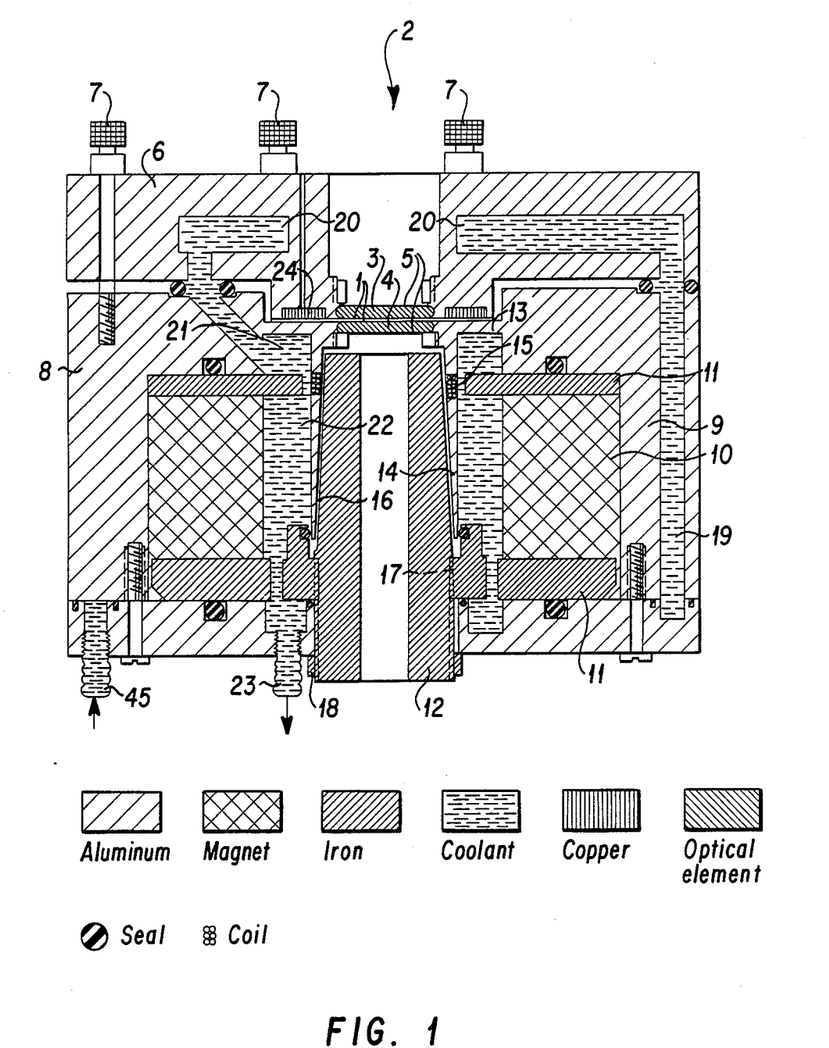
FIG. 1: is a cross-sectional view of the modulator according to the invention.

In the preferred embodiment of the modulator according to the invention illustrated in FIG. 1, the flat surfaces 1 of the plates 3 and 4, which are transparent for the laser beams 2, form an interferometer arrangement. The flat surfaces 1 face each other and reflect toward each other. The backsides 5 of the transparent plates 3 and 4 are dereflective. The plate 3 is firmly connected to the upper part 6 of the instrument base. The upper part 6 can be adjusted by means of the three adjustment screws 7 against the massive bottom part 8 of the instrument base, whereby the spacing and parallel position of the two plates 3:4 are adjusted in relation to each other. The bottom part 8 of the instrument base comprises essentially a oscillation-resistant housing 9, which encloses the powerful permanent magnet 10 including the magnetic poles 11 and the adjustable hollow body 12, preferably the iron core of the permanent magnet (10). This stable unit forms the basis for the oscillatable system, which comprises an elastic membrane 13, on which the plate 4 is fastened, and a special hollow cylinder 14, which supports a coil 15. This oscillatable system ensures that the distance between the plates 3; 4, and thus the transmission of the modulator, is changed as a function of the control voltage applied to the coil 15 so that, on the one hand, it is driven by the electro-magnetic reciprocal effect between the permanent magnet 10 and the coil 15, through which the control current is flowing, and so that, on the other hand, the system is damped by a frictional force produced by a highly viscous medium 16 present in the gap between the special hollow cylinder 14 and the hollow body 12, which preferably comprises the iron core of the electro-magnet 10. The coil 15 is located in the air gap between the poles of the permanent magnet 10.

Figure 2:
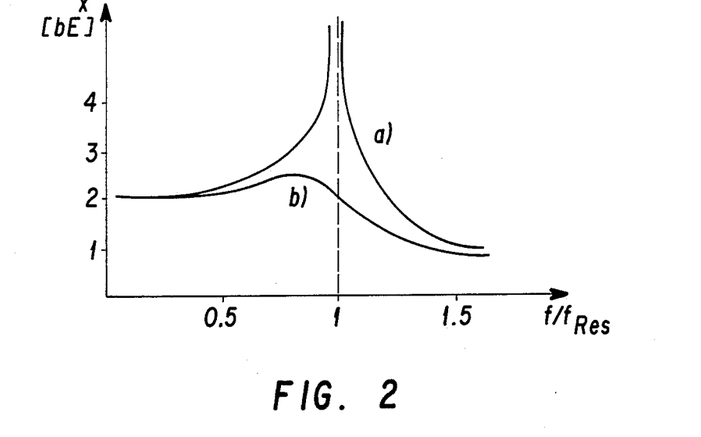
FIG. 2: shows the oscillation amplitude x of the oscillatable plate of the modulator as a function of the frequency f of a defined sine-shaped stimulating current for the completely undamped case (a) and the optimum damped case (b)
Figure 3:
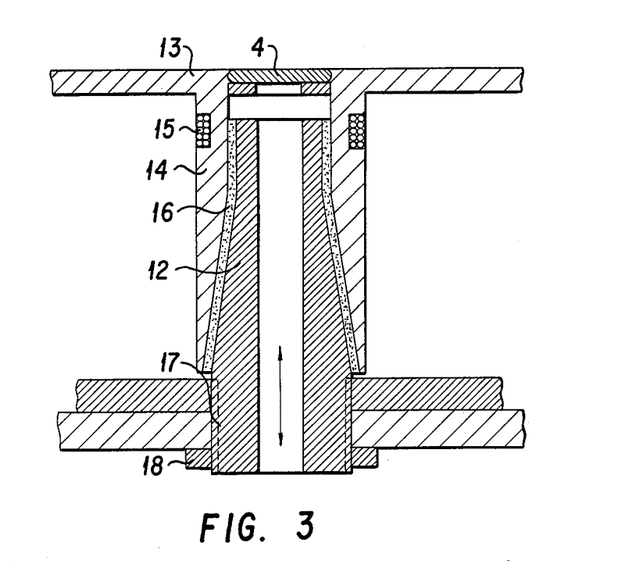
FIG. 3: shows the damping system of the modulator for the damping adjustment.

FIG. 2 illustrates the oscillation curves of this system for two typical cases. The curve designated as (a) shows the dependence of the deflection upon the frequency f of a defined, sine-shaped stimulating current in the case of entirely undamped oscillation; the curve designated as (b) shows the same for the optimally damped oscillation, whereby approximately equal deflections are attained for all frequencies between f=0 and f=fRes. The case (b), which is of critical importance in the use of the instrument as a freely controllable modulator, is solved according to the invention by an apparatus as illustrated in FIG. 3. FIG. 3 shows that in the damping-effective area of the inside surface of the special hollow cylinder 14 and the outside surface of the hollow body 12 functioning as a counterpart, are designed slightly conical with identical incline, so that the effective width of the gap between these two surfaces, which is filled with a highly viscous damping medium 16, can be changed by slightly shifting the hollow body 12 along its axis in such a way, that the system can be simply reversed from the strongly damped oscillating state to the practically undamped oscillating state or vice versa. This defined longitudinal shifting of the hollow body 12 takes place by screwing out with the help of a precision thread 17, and locking the position with a fastening ring 18. The viscosity of the damping medium 16 is thereby matched with the parameters of the oscillatable system (in particular the effective spring constant and mass as well as the selected interval of the gap width between the hollow body 12 and the special hollow cylinder 14).

The entire modulator is kept thermally stable by a circulating coolant. After inlet 45 (FIG. 1), the thermostated cooling liquid enters via channels 19 into cooling bores 20 of the upper portion 6 of the instrument base, thus causing the cooling of the plate 3. The cooling liquid then flows through the chamber 21, and subsequently flows around the coil 15, whereby the beam energy absorbed in plate 4, and the heat generated by the current of of the coil 15 are drawn off. After passing chamber 22, the cooling liquid reaches the outlet 23.

Figure 4:
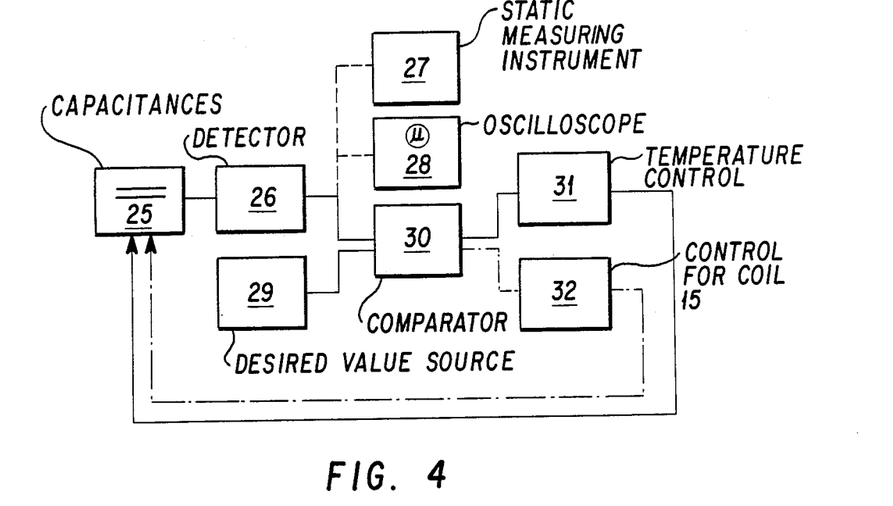
FIG. 4 shows an automatic control system for the electronic control of the modulator transmission with the help of the capacitive measurement of the spacing of the plates.

The capacitive measurement of the relative position of the plates 3 and 4 in relation to each other is effected by a suitable electronic apparatus, the capacities of the three small capacitors 25, which are formed by the elastic membrane 13 and the three copper ring sections 24, which are arranged circularly around the stationary plate 3. Ground potential is applied to membrane 13 as well as to the entire instrument base. FIG. 4 shows the principle of the measurement and control of the plate distance of the plates 3; 4. The capacity of the system copper plates 24 - membrane 13 is detected with the help of the electronic circuit package 26 and is transformed into a measurement signal, which can be represented either statically by the measuring instrument 27 or dynamically by an oscilloscope 28. If in the electronic circuit package 30 a control value is derived from the measurement signal by comparison with a desired value, which is defined with the aid of the circuit package 29 then, by means of a control 31 for the temperature of the cooling liquid, the control value can either be used in order to adjust and stabilize the operating point of the system, or it can be used by means of a control 32 for the current of the oscillation coil 15, in order to control the oscillation amplitude of the plate 4 to a given desired value.

FIGS. 5 to 10 show the various configurations or novel functions, which can be realized with the modulator according to the invention.

Figure 5:
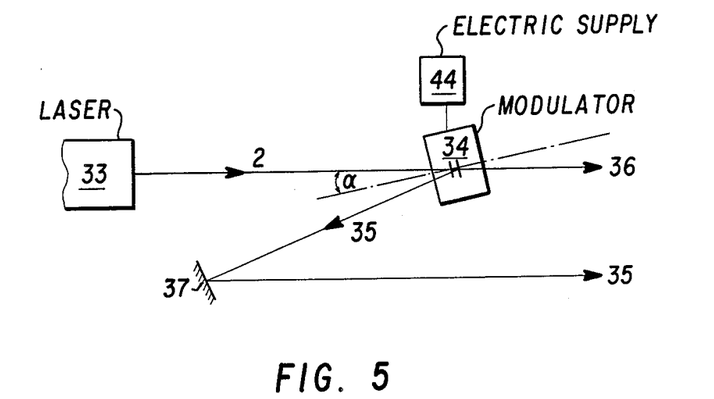
FIG. 5: shows an aparatus for the external modulation of the laser beams.

FIG. 5 shows the basic configuration for the external modulation of laser beams. The beam 2 of the laser 33 impinges upon the modulator 34, which is controlled by the electrical supply device 44. The optical axis of the modulator 34 is tilted at a small angle against the axis of the laser beam 2, for avoiding feedback effects with the laser and allowing receiving the reflected portion 35 of the laser beams 2 with the mirror 37. In this way, two working beams are provided, i.e., the transmitted portion 36 and the reflected portion 35, which show timewise inverse behavior of the intensity modulation.

Figure 6:
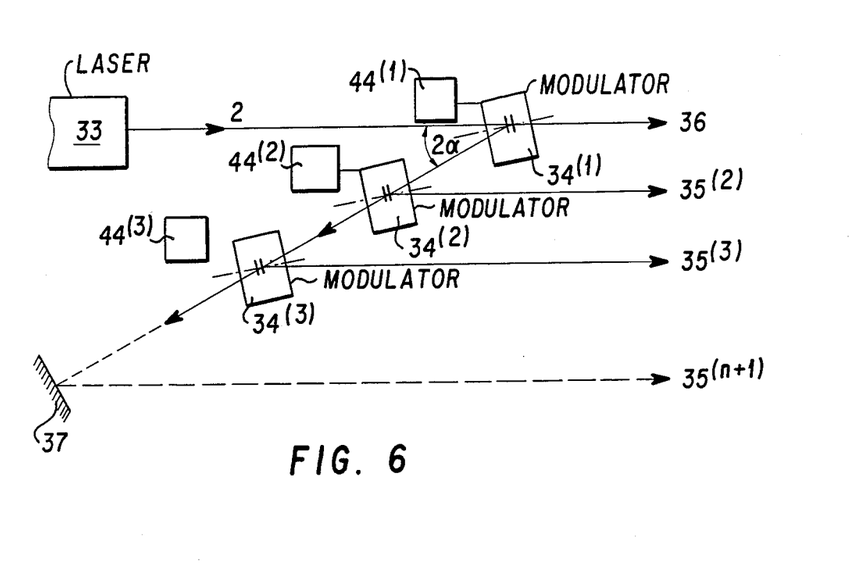
FIG. 6: shows an apparatus for external multiple modulation of laser beams.

A further development of the basic construction for specific work objects is shown in FIG. 6. The cascade configuration of the modulators 34.1, 34.2 . . . , 34.n, whereby each one has its axis tilted at a slight angle $\alpha$ to the respective beam axis, producing n+1 working beams 36, 35.2 . . . , 35. (n+1), which make it possible to carry out various work objects under corresponding control of the modulators.

Figure 7:
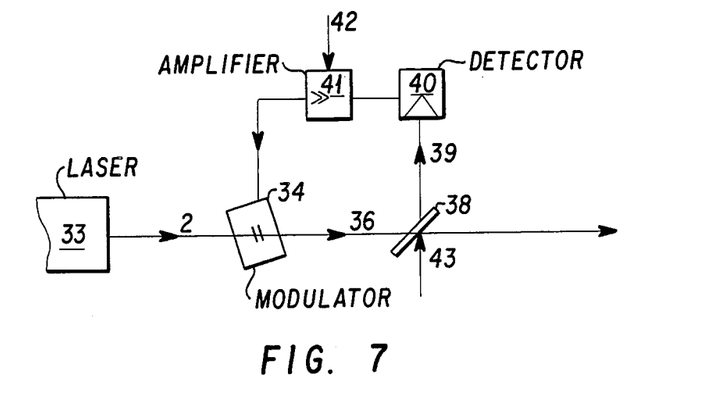
FIG. 7: shows the modulator with optical-electrical feedback.

The utilization of the modulator according to the invention for the external modulation of laser beams with optical-electric feedback is shown in FIG. 7. The transmitted portion 36 of the beam 2 emitted by the laser impinges upon a splitter plate 38, which consists of a transparent material of only relatively low reflectivity. The proportionally lowpowered portion 39 reflected by this plate is registered by the detector 40, which preferably has a small time constant of 10 us, the resulting electrical signal is amplified in the electronic amplifier 41, which controls the coil 15 of the modulator 34. This optical-electrical feedback, and thus the function of the modulator, can additionally be influenced by external electrical signals 42 or external optical signals 43.

Figure 9:
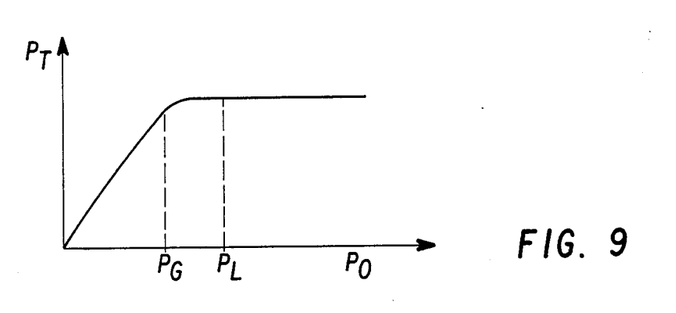
FIG. 9: shows the transmitted energy PT as a function of the input energy PO at stabilizing effect of the modulator with optical-electrical feedback.
Figure 10:
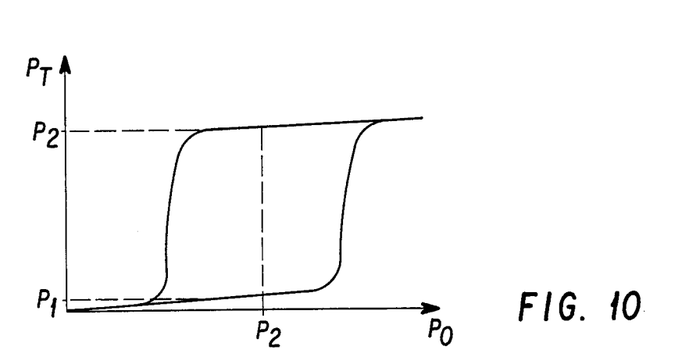
FIG. 10: shows the transmitted energy PT as a function of the input energy PO at optical bi-stable behavior of the modulator with optical-electric feedback.

This allows the illustrated arrangement performance of a series of functions. Two functions, which are of especial importance for applications, are shown in FIGS. 8, 9 and 10:

the effective stabilization of the transmitted portion 36 of the beam for modulator transmissions approximating 1;

the optical bi-stable behavior of the modulator.

Figure 8:
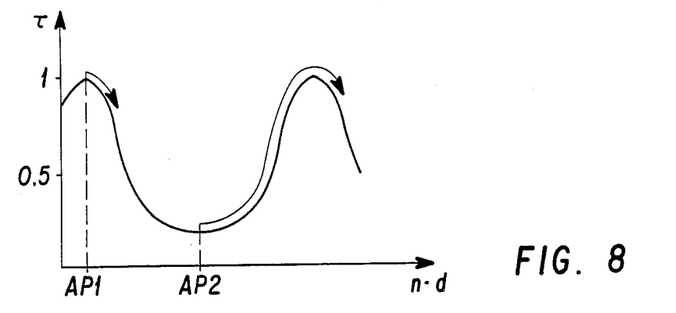
FIG. 8: shows the operating point AP1 for effective stabilization of the transmitted energy and AP2 for optical bi-stable behavior of the modulator with optical-electrical feedback.

FIG. 8 shows the positions of the corresponding working points on the transmission curve of the modulator. The working point AP1 is set for stabilization. The arrow characterizes the direction of the modulator tuning at an increase of the beam energy impinging upon the modulator. The effect of the tuning is shown in FIG. 9, i.e., the stabilization of the energy PT of the transmitted beam 36, when the energy PO of the impinging beam is above a value PC, which in particular depends upon the feedback. The feedback is advantageously set in such a way that the laser energy PL, which has to be stabilized, approximately has the PT (PO) characteristic position shown in FIG. 9.

The working point AP2 is adjusted if the apparatus according to the invention is meant to show optical bi-stable behavior. As before, the arrow characterizes again the direction of the modulator tuning at increasing input energy PO. FIG. 10 shows the typical hysteresis of the PT(PO) characteristic for the optical bi-stable behavior. The parameters of the system, in particular again the feedback, are advantageously set in such a way, that the laser energy PL to be controlled has the position of the PT(PO) characteristic shown in FIG. 10. Thus, by means of optical or electrical control signals 43; 42, it is possible to switch the system back and forth between the values P1 and P2 for the transmitted energy.

What is claimed is:

1. In an apparatus for the external modulation of $CO_2$ laser beams utilizing two plates which are flat on both sides and are planar-parallel with respect to each other and which form a gap of defined width therebetween; the plates being made of transparent material, such as Ge, GaAs, or ZnSe: the inner surfaces of the two plates facing each other being reflective and outer surfaces thereof being non reflective and the distance between them is variable, the improvement wherein one of the two plates is rigidly connected for the regulation of the planar-parallel distance from the other plate to a massive base comprising a permanent magnet including its assigned magnetic iron path and a housing resistant to oscillation, the other plate being fastened to a hollow cylinder, the cylinder being affixed to an elastic membrane to thereby form an oscillatable system with respect to the instrument base; means driving the oscillatable system by the electro-magnetic interaction between the permanent magnet and a coil through which the control current flows; the coil being mounted on the hollow cylinder and being located in the air gap between the poles of the permanent magnet; and means damping the oscillatable system by the frictional force of a damping medium of a predetermined high viscosity; the damping medium being located in the gap between the inner surface of the hollow cylinder and the outside surface of a hollow body fixedly connected to the instrument base, whereby the width of the gap and the viscosity of the damping medium are matched with respect to each other so that the frictional force required for the damping can be adjusted, and further comprising cavities in the system for the circulation of a thermostated cooling liquid, in order to carry off therewith the heat resulting from the absorbed laser beams as well as the heat resulting from the coil current, thus keeping the entire apparatus at a stable temperature.

2. Apparatus for the external modulation of $CO_2$ laser beams according to claim 1, wherein, in the damping-effective area, the inside surface of the hollow cylinder, and the outside surface of the hollow body functioning as a counter part, are conical of identical incline in the direction of the axis of the modulator, so that by a shift of the hollow body along its axis, the effective width of the gap between the hollow cylinder and the hollow body can be varied, the gap being filled with the damping medium, so that the damping characteristic can be reversed from a damped state into the substantially undamped state or vice versa, and means for holding any given adjusted position.

3. Apparatus for the external modulation of $CO_2$ laser beams according to claim 1, wherein the membrane forms a metallic mounting of the oscillatable optics, further comprising a metal ring divided into three parts, the metal ring being arranged to define three equally large capacitors with the membrane, of which each is assigned to a separate adjustment element provided for the adjustment of the fixedly arranged plate, whereby the capacity of the capacitor enables determination of the measurement of the distance and/or the parallel position of the plates.

4. Apparatus for the external modulation of $CO_2$ laser beams according to claim 1 comprising means for determining the measurement value supplied by the capacitors, means comparing the detected value with a defined desired value to provide a differential signal and means evaluating the differential signal as a reference input for the control for the adjustment of the transmission state of the modulator at a currentless coil by changing the distance between the plates.

5. Apparatus for the external modulation of $CO_2$ laser beams according to claim 1 wherein the modulator is arranged at an angle to the laser beam which, on the one hand, is so small that the interference capacity of the system is only negligibly affected, and that the angle, on the other hand, is so great that it safely prevents without optical auxiliary means, undesired feedback to the laser resonator of the beam portion reflected by the modulator; the reflected beam portion being collected by an additional mirror and routed onward to a target, so that both beams supplied by the modulator can be used for specific tasks.

6. Apparatus for the external modulation of $CO_2$ laser beams according to claim 1 wherein a plurality of said modulators are arranged such that the reflected beam of a first modulator is again modulated by a second modulator, of which the reflected beam is used for the given work object and the transmitted beam thereof is either deflected by a mirror or the reflected beam is again modulated by another modulator and is separated into two beams of intensities which are timewise reverse in relation to each other, so that depending on the number of the modulators connected in series, a total of $n+1$ workbeams result, which can be freely selectably controlled, or can be controlled differently by the individual modulators.

7. Apparatus for the external modulation of $CO_2$ laser beams according to claim 1 wherein a reflecting splitter plate is provided in the beam transmitted by the modulator such that a portion of the beam is directed to a detector with a, the output signal of the detector being amplified by an electronic amplifier and applied as a feedback signal for the control of the modulator coil whereby, by means of additional electric signals supplied to the amplifier and/or optical signals supplied to the detector, the transmission state of the modulator is adjusted to stop the current in the coil, which can occur by the adjustment elements or with the help of the temperature of the thermostated cooling liquid, and the magnitude of the feedback.

8. Apparatus for the external modulation of $CO_2$ laser beams according to claim 1 comprising means for detecting the measurement value supplied by the capacitors, means comparing the detected value with a perdetermined value to provide a differential signal, and means evaluating the differential signal by directly influencing it with the aid of electronic means controlling said adjustment elements.

9. Apparatus for the external modulation of $CO_2$ laser beams according to claim 1 comprising means for detecting the measurement value supplied by the capacitors, means comparing the detected value with a predetermined value to provide a differential signal, and means evaluating the differential signal by indirectly influencing it without change in the position of the adjustment elements, by changing the temperature of the thermostated cooling liquid, whereby the cavities provided for the circulation of the thermostated cooling liquid in the total system are arranged so that change in the temperature assures an even adjustment of the spacing of the plates.

10. Apparatus for the external modulation of $CO_2$ laser beams according to claim 1 comprising means for detecting the measurement value supplied by the capacitors, means comparing the detected value with a perdetermined value to provide a differential signal and means evaluating the differential signal as a reference input for the control of which the regulating signal adjusts the oscillating amplitude of the oscillatable plate by controlling the current of the oscillation coil.

* * * * *